Jan. 11, 1927.
R. E. HALL
1,613,701
TREATMENT OF BOILER WATER
Filed June 6, 1924   3 Sheets-Sheet 1
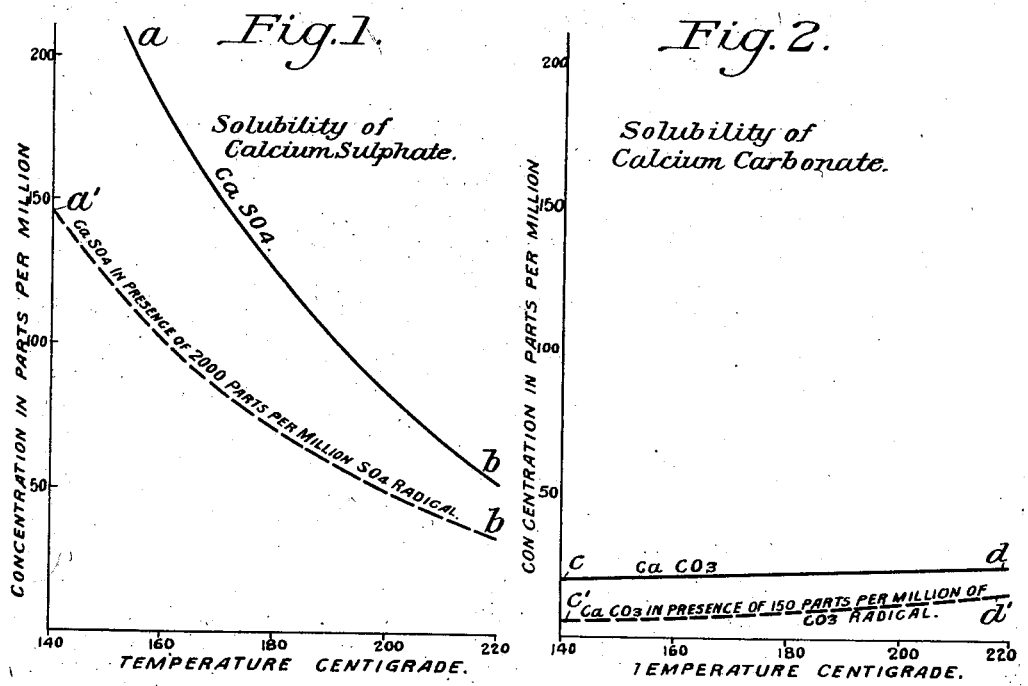
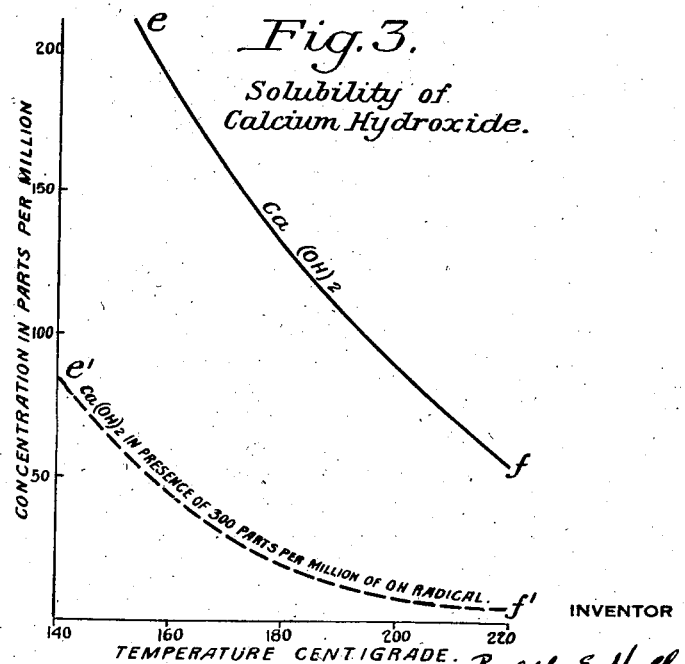
INVENTOR
Ralph E. Hall
by his attorneys
Byrnes, Stebbins & Parmelee

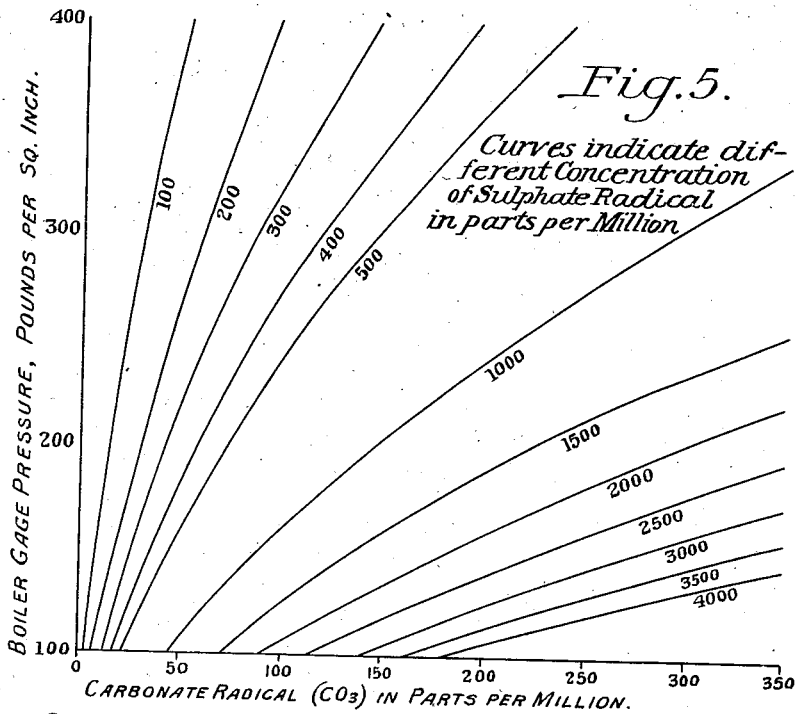
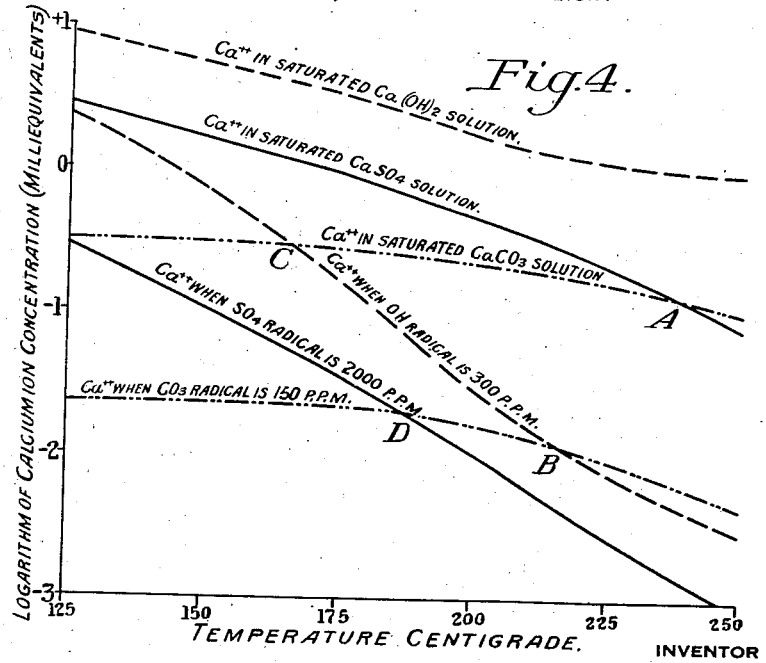

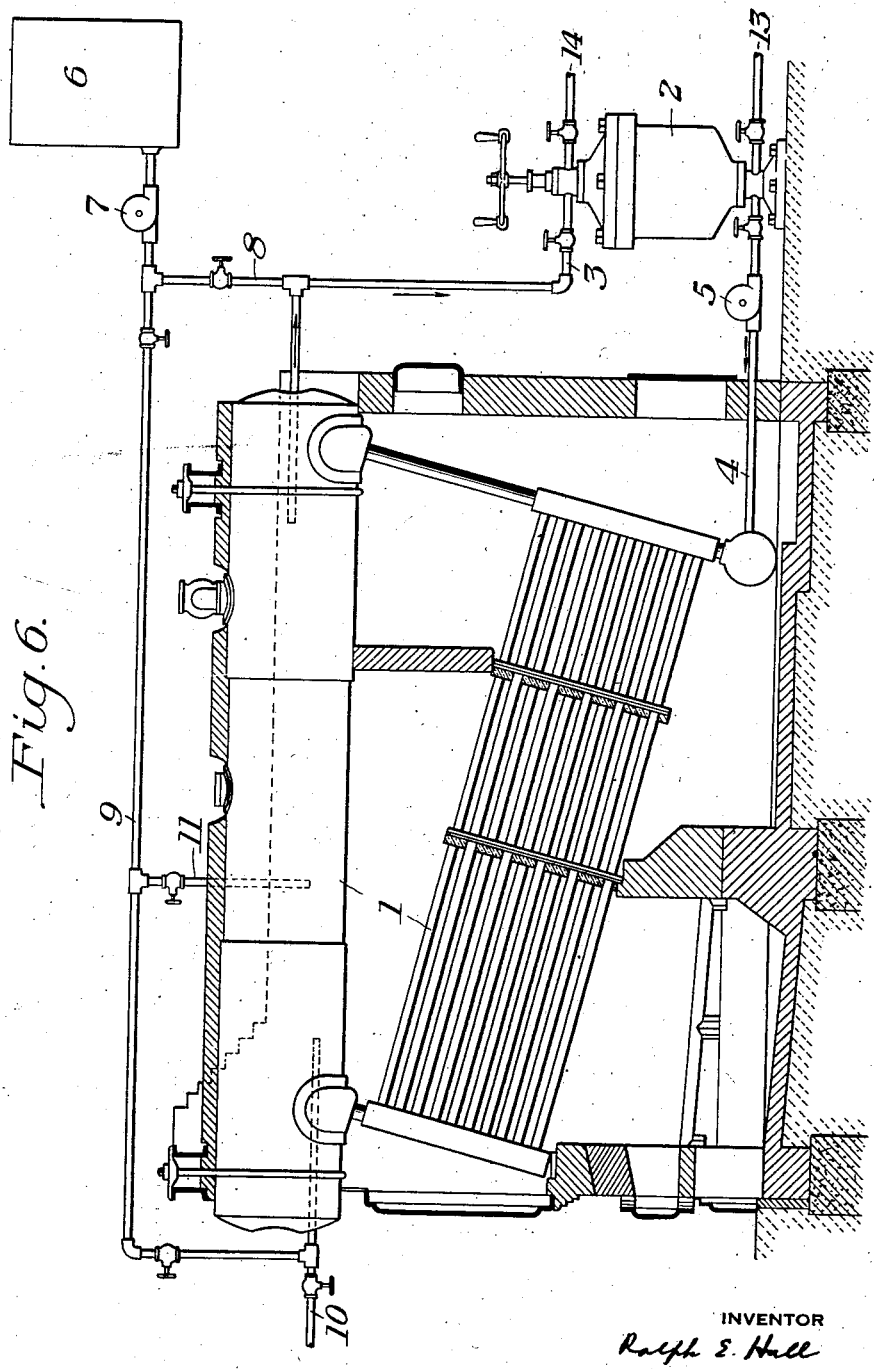

Patented Jan. 11, 1927.

1,613,701

UNITED STATES PATENT OFFICE.

RALPH E. HALL, OF PITTSBURGH, PENNSYLVANIA, ASSIGNOR TO JOHN M. HOPWOOD, OF DORMONT BOROUGH, PENNSYLVANIA.

TREATMENT OF BOILER WATER.

Application filed June 6, 1924. Serial No. 718,322.

Figures 1 to 3 inclusive are temperature-solubility curves for certain salts occurring in boiler waters;

Figure 4 contains curves representing the calcium ion concentration in equilibrium with various solid phases at various temperatures and under varying conditions;

Figure 5 contains curves by reference to which may be obtained the satisfactory carbonate radical concentrations for various concentrations of sulphate radical, and for various pressures of boiler operation;

Figure 6 shows in elevation a boiler provided with a sludge-separating apparatus which may be used, if desired, in conjunction with the present invention.

This application is a continuation of my co-pending application Serial No. 692,804, filed February 14, 1924.

The present invention relates to the treatment of natural waters used for steam generation, and more especially to the conditioning of boiler water.

The efficient and economic operation of a steam boiler requires, among other things, (1) that the surfaces in contact with the water shall not be covered with scale; (2) that corrosion shall not occur at these surfaces; (3) that foaming and priming resulting in wet steam shall be inhibited; and (4) that the waste of heated water in the blow-down be reduced to a minimum. These factors are dependent upon (a) the amount and nature of the soluble material in the boiler feed water; (b) the character and amount of precipitates which form in the boiler as the feed water undergoes concentrations incident to evaporation; and (c) the chemical reactions which occur in the boiler at its heating surfaces. These conditions may be controlled by the maintenance in the boiler itself of the necessary conditions of proper concentration, etc.

Natural waters in practically all instances contain dissolved impurities, including oxygen and carbon dioxide from the air, and calcium, magnesium and sodium sulphates, carbonates, bicarbonates, chlorides and nitrates from contact with the soil, as well as silica, salts of iron, etc.

The primary product of the boiler is steam. The secondary and undesirable product is the concentrated solution of these impurities which result in the precipitation of salts in the boiler either as adherent scale or non-adherent sludge, necessitating cleaning the heating surfaces of the boiler of scale and blowing down to remove the sludge and decrease the content of soluble salts.

Even if the boiler feed water be treated to remove the scale or sludge-forming impurities, the concentration of such impurities in the boiler may eventually reach the saturation point, resulting in the precipitation of the impurities either as a scale adherent to the boiler surfaces (undesirable condition) or as a non-adherent sludge (desirable condition) which may be removed by filtration or by blow-down. The term "soft" or "non-adherent scale" is sometimes applied to what is here mentioned as sludge.

Calcium is usually the major metallic element of the scale and sludge-forming salts in the water, and for simplicity of explanation, the conditions of the precipitation of the calcium as adherent scale or non-adherent sludge will be first considered.

If the calcium is precipitated as calcium sulphate, it forms a hard dense adherent scale on the heating surfaces of the boiler. Calcium may also be precipitated in the form of calcium hydroxide or calcium silicate, which also form a hard adherent scale on the heating surfaces of the boiler. On the other hand, if the calcium can be precipitated as calcium carbonate, it is precipitated in the form of a sludge or soft scale which does not adhere to the heating surfaces of the boiler.

While the calcium carbonate is precipitated in the form of a sludge, a small amount of it may enter into the composition of a thin film which sometimes forms on the boiler surfaces. This thin film consists usually of about 85% calcite, 10% hydrous magnesium silicate and 5% iron hydroxide and silica. It is soft and porous and very readily permeable by the water. It does not increase in thickness when the sulphate-carbonate ratio is properly maintained as hereinafter described. It flakes off readily and is carried away by the circulation of the water. This thin calcite film is not particularly objectionable and is to be distinguished from the adherent scale which grows in thickness, which is relatively impermeable by water, and which is detrimental to heat transfer at the boiler surfaces, and the prevention of which is the object of my treatment.

It will be readily apparent, therefore, that the boiler water should be maintained in a condition favorable to the formation of calcium carbonate and adverse to the formation of calcium sulphate or calcium hydroxide. The other and usually minor impurities, such as magnesium and iron salts, silicates, etc., whose saturation is exceeded as their concentration in the boiler water is increased by evaporation, may be precipitated either as an adherent scale or as a non-adherent sludge. Fortunately, the maintenance of the ion concentrations which favor the formation of calcium carbonate or other non-adherent calcium salts and inhibit the formation of calcium sulphate and calcium hydroxide, also favor the precipitation of the minor impurities mentioned in non-adherent form instead of as adherent scale.

It is a well recognized chemical fact that saturation represents an equilibrium between undissolved solid and undisassociated molecules and ions of the salt in question. It is also established that the product of the concentrations of the ions to their appropriate exponents in such equilibrium for any given temperature is a constant known as the solubility product, which, if exceeded, results in the precipitation of the solid phase. It follows, therefore, that the introduction of a common ion into a solution which is at or near saturation results in the solubility product being exceeded and the precipitation of the solid phase of one salt.

Consider a saturated solution of calcium sulphate in contact with its solid phase at any temperature. The equilibrium relation may be expressed as:

$$CaSO_4 \rightleftarrows CaSO_4 \rightleftarrows Ca^{++} + SO_4^{--}$$
$$\text{Solid.} \quad \text{Dissolved.}$$

The solubility product at this temperature is expressed by the equation:

$$K_{s.p.\,CaSO_4} = [Ca^{++}] \times [SO_4^{--}]$$

in which $[Ca^{++}]$ and $[SO_4^{--}]$ represent the concentrations of calcium and sulphate ions, respectively, expressed in terms of chemical equivalents.

Similarly, the equilibrium of a saturated calcium hydrate solution in contact with its solid phase may be expressed as follows:

$$Ca(OH)_2 \rightleftarrows Ca(OH)_2 \rightleftarrows Ca^{++} + 2OH^-$$
$$\text{Solid.} \quad \text{Dissolved.}$$

and its solubility product at the temperature of the equilibrium is expressed as:

$$K_{s.p.\,Ca(OH)_2} = [Ca^{++}] \times [OH^-]^2$$

Similarly, the equilibrium condition of calcium carbonate in saturated solution in contact with its solid phase and its solubility product at the equilibrium temperature may be expressed as follows:

$$CaCO_3 \rightleftarrows CaCO_3 \rightleftarrows Ca^{++} + CO_3^{--}$$
$$\text{Solid.} \quad \text{Dissolved.}$$

$$K_{s.p.\,CaCO_3} = [Ca^{++}] \times [CO_3^{--}]$$

Consider now the effect of adding to the saturated solution of calcium sulphate at a given temperature some salt which will furnish sulphate ion to the solution, as for example, sodium sulphate. The concentration of sulphate ion is increased, and as a result, the product of calcium ion concentration into sulphate ion concentration exceeds the value of $K_{s.p.\,CaSO_4}$. This condition is unstable and is relieved by the reversal of the calcium sulphate equilibrium in a direction such that solid calcium sulphate is precipitated. The amount which will be precipitated is governed by the concentration of calcium and sulphate ions. The precipitation makes their product again equal to the solubility product of calcium sulphate. The result of this addition of common ion on the amount of calcium sulphate which can be held in solution is to decrease this amount very materially because the amount of calcium ion in solution varies inversely as the amount of sulphate ion. An increase of sulphate ion in the boiler water, due to evaporation, therefore, decreases the amount of calcium ion which may be held in solution in the water.

It is recognized that the value of $K_{s.p.}$ (solubility product) for any salt at a chosen temperature is not entirely constant or unaffected by the presence of other substances in solution, whether they introduce a common ion or not; but the variations in $K_{s.p.}$ thus caused are not sufficient to alter its significance for practical application in the conditioning of boiler water, as the concentrations of the salts in question are relatively small.

The value of $K_{s.p.}$ varies largely with temperature changes for two reasons: (a) the concentration or total amount of undisassociated molecules and ions in equilibrium with the solid phase changes with temperature; (b) the per cent of disassociated molecules or ions changes with the temperature. Consider the solubility curve of calcium sulphate, as shown in Figure 1 of the drawing, in which the abscissæ are temperatures of the solution of calcium sulphate and the ordinates are the concentration expressed as parts per million. Throughout this specification, concentrations are expressed as parts by weight of the solute or chemical equivalents of the solute, in parts by weight of the resulting solution. The curve $a\ b$ represents the solubility of calcium sulphate in pure water and shows the concentrations at the various temperatures plotted, of a saturated solution. At the point $a$, the total concentration of $CaSO_4$ in the solution and also the per cent of disassociated molecules is higher than $b$. Hence:

$$K_{s.p.CaSO4} \text{ at } a > K_{s.p.CaSO4} \text{ at } b$$

The introduction of a common ion influences the solubility of salts of that ion. Thus the presence of some other sulphate in solution, as for example, sodium sulphate, will lower the solubility of the calcium sulphate, and its solubility curve will be lowered to a position, say to the curve $a'$ $b'$, corresponding to some definite concentration of sulphate ion; in the specific example shown in Figure 1, the concentration of sulphate radical ($SO_4$) being 2,000 parts per million. Intermediate amounts of sulphate radical will cause the solubility curve of calcium sulphate to lie in positions intermediate the curves $a$ $b$ and $a'$ $b'$.

It will be noted that, as shown by these curves, the solubility of calcium sulphate decreases with temperature increase within the temperature range plotted.

In Figure 2, the curve $c$ $d$ shows the relation between the temperature and the concentration of a saturated solution of calcium carbonate in pure water, and the curve $c'$ $d'$ shows such relation when concentration of carbonate radical ($CO_3$) is increased to 150 parts per million, as for example, by the addition of sodium carbonate. It will be noted that the solubility of calcium carbonate increases with the temperature over the temperature range plotted.

In Figure 3, the curve $e$ $f$ shows the relation between the temperature and the concentration of a saturated solution of calcium hydroxide in pure water, and the curve $e'$ $f'$ shows such relations when concentration of hydroxyl radical (OH) is increased to 300 parts per million, as for example, by the addition of sodium hydroxide. It will be noted that the solubility of calcium hydroxide decreases with the temperature over the temperature range plotted.

From the electrical conductivity of salts of the different ionic types, Noyes and his co-workers (Publication No. 63, Carnegie Institution of Washington) have determined their degree of disassociation over a wide temperature range. Since the ionization values for salts of any one ionic type are nearly the same, the concentration of ionic calcium in saturated solutions of the sulphate, hydroxide and carbonate may be readily obtained from Noyes's data. In Figure 4, the values of calcium ion for pure saturated water solutions so obtained are plotted against temperature, and the saturation values of calcium ion in the presence of excess sulphate, hydroxide and carbonate are likewise plotted against temperature.

The stable solid phase in equilibrium with the boiler water at any temperature and with varying concentrations of $SO_4$, $CO_3$ and OH is the one corresponding to the lowest saturation value of $Ca^{++}$. Thus at intersection A and the $CO_3$ and $SO_4$ concentration indicated, $CaCO_3$ and $CaSO_4$ coexist as solid phase. To the left of A, $CaCO_3$ is the solid phase, and to the right, $CaSO_4$ is the stable solid phase. When the $SO_4$ concentration is 2,000 parts per million and $CO_3$ is 150 parts per million, the intersection is at D. Thus a boiler, operating at 150 pounds per square inch gage pressure, or 185° C., is too close to the intersection for certain prevention of $CaSO_4$ deposition, and either the $CO_3$ concentration should be increased, or the $SO_4$ concentration diminished. In general, inhibition of $CaSO_4$ deposition demands operation in the field to the left of the intersection as determined by the $CO_3$ and $SO_4$ concentrations.

Consider the adjustment of this intersection in the case of calcium sulphate and calcium carbonate. At the point of intersection, the solid phases of both calcium carbonate and calcium sulphate are in stable equilibrium with the boiler water, and the calcium ion concentration in the solubility product relations of the two materials is the same. With the calcium ion concentration term cancelled, the ratio of the solubility products of carbonate and sulphate is equal to the ratio of carbonate ion to sulphate ion, or:

$$[CO_3^{--}] = \left(\frac{K_{s.p.CaCO3}}{K_{s.p.CaSO4}}\right) \text{at temperature of boiler water} \times [SO_4^{--}]$$

It is a purpose of the boiler water conditioning herein described to prevent the deposition of calcium sulphate as solid phase, by making the carbonate ion concentration somewhat greater than the ratio of the solubility product of calcium carbonate to that of the sulphate at the temperature of the boiler water into the sulphate ion concentration; or what is the same thing, to make the intersection point, such as D, occur at a temperature higher than the maximum temperature encountered in the boiler water.

In most cases, it is easiest and most economical to maintain this condition by introducing carbonate radical into the boiler either as soda ash or sodium bicarbonate. It is fully possible, however, to allow the concentration of carbonate radical to remain low by decreasing the sulphate radical, as by the use of a barium salt, such as barium carbonate, or by blow-down until the conditions of the equation are fulfilled. Barium carbonate, when used, not only decreases the sulphate concentration by precipitating barium sulphate, but also may furnish all or a part of the carbonate radical concentration required.

For simplicity, the isohydric principle has not been used in calculating the curves of Figure 4, and hence, points of intersection A, B, C, and D are in slightly different position from what they would be if the isohydric principle had been taken into account. This variation is not more than the usual limits of variability of the carbonate concentration which can be maintained in boiler operation. The curves of Figure 5 have been developed with full consideration of the isohydric principle. It will be understood, of course, that Figure 4 is presented for purposes of explaining the invention, whereas Figure 5 illustrates the type of curve which is actually used in computing the amount of carbonate radical to be maintained in the boiler water.

Under boiler conditions, the rapid development of steam results in an exceedingly small partial pressure of carbon dioxide in the gaseous phase in contact with the boiler water, and gaseous carbon dioxide passes off with the steam, and hydroxyl ion is introduced into the boiler water by the hydrolysis of the sodium carbonate and remains in the water. This condition is not disadvantageous as the tendency of hydroxyl is to inhibit corrosion by minimizing hydrogen ion concentration, but if the concentration of hydroxyl ion rises high enough, there is the same possibility that the solubility curve of calcium hydroxide will intersect the calcium carbonate curve as occurred in the example just presented of calcium sulphate. Thus in Figure 4, B represents a point at which calcium carbonate and calcium hydroxide coexist as solid phase, when the intersection D occurs to the right of B, that is, when the sulphate concentration is low enough so that calcium hydroxide is precipitated in preference to calcium sulphate. To the left of B, calcium carbonate, and to the right, calcium hydroxide, is the stable solid phase. The latter condition is undesirable, as calcium hydroxide forms adherent scale. It is desirable, therefore, to so regulate the development of hydroxyl ion concentration in the boiler water that intersection point B shall occur at a temperature higher than that encountered in the boiler water. The necessary criterion to maintain in the boiler water to assure this condition is as follows:

$$[CO_3^{--}] \text{ shall not be less than } \left(\frac{K_{s.p.\,CaCO_3}}{K_{s.p.\,Ca(OH)_2}}\right) \text{ at temperature of boiler water times } [OH^-]^2$$

In practice, to maintain this condition, either the concentration of the hydroxyl ion may be, on the one hand, diminished by carbonic acid introduced by the addition of a bicarbonate or by the addition of carbon dioxide, or, on the other hand, by diminishing the sulphate ion concentration, as by the use of a barium compound whereby the concentration of carbonate ion need not become so great and thereby the development of hydroxyl ion concentration be retarded. At temperatures above 200° C. (210 pounds per square inch gage pressure), it is advisable to use phosphate in place of carbonate radical, as it does not decompose so readily, to increase the hydroxyl radical concentration.

As will be apparent from the temperature solubility curves, a carefully limited amount of carbonate, such as sodium carbonate, should be added to the boiler water. The sodium carbonate yields carbonate ion which precipitates calcium as calcium carbonate. It also yields hydroxyl ion which precipitates magnesium as magnesium hydroxide. The hydroxyl ion also tends to minimize the hydrogen ion concentration at the metal surfaces and thus prevent corrosion. On the other hand, a too great hydroxyl ion concentration, which will occur if an indiscriminate excess of sodium carbonate is added, will cause the precipitation of calcium hydroxide as an encrusting scale. Moreover, hydroxyl ion in its higher concentrations is an excellent peptizing and saponifying agent, and will accelerate foaming, particularly if there is colloidally disposed material or saponifiable organic matter in the water.

It is a matter of common observation that the most rapid deposition of hard adherent scale in boilers occurs on the more highly heated surfaces of the boiler. The reason for this is apparent from a consideration of the temperature solubility curves of calcium sulphate, calcium hydroxide and calcium carbonate. The water in immediate contact with the most highly heated boiler surfaces reaches the maximum temperature attained in the boiler, and this temperature may be considerably above the average temperature of the water or the temperature of the water at the boiler surfaces which are not in proximity to the flame from the combustion chamber. As the water is increased in temperature by contact with a higher heated surface of the boiler, the calcium sulphate and calcium hydroxide have their solubilities decreased, while the solubility of the calcium carbonate is increased. Therefore, while at the temperature of the main body of water in the boiler, the calcium sulphate and calcium hydroxide are not precipitated they may be precipitated at the heated surface. Since the solubility of the calcium carbonate is actually increased with temperature, the carbonate ion exerts less inhibiting effect on the precipitation of calcium sulphate and calcium hydroxide at the heated surface than in the rest of the boiler. On the other hand, since the solubilities of calcium sulphate and calcium hydroxide increase with falling temperature and the solubility of calcium carbonate decreases with falling temperature, there is no tendency to precipitate the calcium sulphate or hydroxide in the cooler portions of the boiler, but instead the calcium carbonate is there precipitated. Moreover, since the coolest regions of the boiler are not at the boiler surfaces, the calcium carbonate is precipitated as a sludge in the boiler water instead of as a scale at the boiler surfaces. The significance of the solubility temperature curves is thus apparent to explain why calcium sulphate and calcium hydroxide form an adherent scale and why calcium carbonate forms a non-adherent sludge. In general, any salt which has its solubility decreased by a rise in temperature will precipitate against a heated surface, and because of such place of precipitation cause an adherent scale; while a salt which has its solubility increased with the temperature will not be precipitated at a heated surface, and therefore, can not form encrusting scale.

A solubility temperature curve showing a decrease in solubility with the temperature increase, therefore, may be spoken of as an adverse or unfavorable curve, while a solubility temperature curve showing an increase in solubility with the temperature increase may be spoken of as a favorable curve. Similarly, an ion, such for example, as the negative sulphate, hydroxyl, carbonate or phosphate ion, may be spoken of as an adverse or favorable ion, depending upon whether the solubilities of their calcium and magnesium salts decrease or increase, respectively, with rising temperature.

In the preceding discussion, reference has been made primarily to calcium salts. It is unnecessary to deal specifically with other salts which may occur in the boiler water, because those conditions which must be maintained to inhibit the precipitation of calcium sulphate or calcium hydroxide meet the criteria which are necessary for the prevention or minimization of the precipitation of other unfavorable salts, as for instance, magnesium and calcium silicate. The breaking down of the carbonate to form hydroxyl is always sufficient to insure the precipitation of magnesium ion in the form of magnesium hydroxide in large measure, largely in suspension, even though its solubility curve is slightly unfavorable because of its very small solubility in the presence of excess hydroxyl; and the concentrations of carbonate and hydroxyl which are attained inhibit or minimize the precipitation of silicates.

Throughout this discussion, the term "salt" is given the significance of a material which consists of a positive metallic component and a negative component, and is employed as a term of general definition to include calcium and magnesium hydroxides as well as the sulphates, carbonates, etc.

Since the carbon dioxide is continuously drained off with the steam, the carbonate should not be supplied in large amounts and at infrequent intervals, but should be supplied continually, either in relatively small amounts at frequent intervals, or continuously.

While it is preferred to employ a carbonate such as sodium carbonate as the source of the favorable negative ion to inhibit the precipitation of the calcium and magnesium as encrusting salts, other favorable negative ions may be used, such for example, as phosphate ion introduced in the form of trisodium or other phosphate. Calcium phosphate has a low solubility. The phosphate, such as sodium phosphate, readily hydrolyzes to introduce hydroxyl ion into the water, which will prevent the precipitation of magnesium as an encrusting silicate. The magnesium is precipitated as a non-adherent phosphate or hydroxide.

The proper conditioning of a boiler water necessitates that the intersection of the calcium carbonate (or phosphate) and sulphate curves be adjusted according to the pressure at which the boiler is operated. In Figure 5 are plotted the curves showing the relationship between carbonate and sulphate which should be maintained at various pressures, to fix the intersection at such pressures. The ordinates represent gage pressure in pounds per square inch and cover the range customarily met with in boiler operation. The statement of gage pressure is, of course, equivalent to the statement of temperature of the boiler water. The abscissae represent the amount of carbonate radical in parts per million of solution which should be present in the boiler water. The various curves represent definite amounts of sulphate radical in parts per million of the solution. The curves are derived by the use of the formula:

$$[CO_3^{--}] = \left(\frac{K_{s.p.\,CaCO_3}}{K_{s.p.\,CaSO_4}}\right) \text{at temperature of boiler water} \times [SO_4^{--}]$$

taking into account of the isohydric principle of ionization and the variability of the solubility products involved with temperature change. For concentrations of sulphate radical other than those given in the curves, it is easy to interpolate between the given curves. The curves of Figure 5 are plotted in accordance with the best chemical data at present available and are sufficiently accurate for practical boiler operation. Actual operating experience with steam boilers supplied with carbonate in accordance with the curves of Figure 5 have shown the amount of carbonate there indicated to be sufficient for satisfactory scale prevention. The curves shown in Figure 5, or a similar set of curves, are furnished to the boiler operator. He determines the sulphate and carbonate concentration in the boiler water. This determination may be made in any of the usual ways, although I prefer to use the method and type of apparatus disclosed in the article by Hall, Fisher and Smith, published in the Proceedings of the Association of Iron & Steel Electrical Engineers for June, 1924, vol. 1, pp. 312–327.

Having determined the sulphate radical concentration, the boiler operator refers to the set of curves and reads from it the amount of carbonate radical necessary to prevent the precipitation of calcium sulphate scale at the sulphate radical concentration and the boiler pressure in question. He then introduces into the boiler water, either directly into the boiler or into the feed water, a sufficient amount of carbonate radical, usually in the form of sodium carbonate or sodium bicarbonate, to build up the carbonate radical in the boiler to somewhat more than the theoretical amount indicated by the curves shown in Figure 5. For example, if a boiler is operating at 150 pounds per square inch gage pressure (185° C.) and the sulphate determination indicates 1000 parts per million, then the essential condition for the prevention of adherent scale formation is that the boiler water shall contain a little more than 90 parts per million of carbonate radical—a little more, because if only 90 parts per million is present, it is directly on the intersection of the curves, and either calcium sulphate or carbonate may be the solid phase; while with more than 90 parts per million the solid phase can be only calcium carbonate. If the gage pressure is 210 pounds per square inch, and sulphate is 1,000 parts per million, then the carbonate concentration must be slightly greater than 155 parts per million, but if sulphate is 750 parts per million, the carbonate need be but slightly greater than 120 parts per million. The amount of carbonate radical introduced should be somewhat in excess of the theoretical amount indicated in Figure 5, not only as a factor of safety, but also because of the fact that the water in contact with the heating surfaces of the boiler may be at a somewhat higher temperature than the temperature corresponding to the gage pressure. In large boilers, the depth of water may be as great as 30 or 40 feet, and the head of water at the bottom of the boiler is such that the temperature at the bottom of the boiler may be somewhat higher than that indicated by the gage pressure.

With a set of curves such as this, and simple apparatus in the boiler room for the determination of sulphate and carbonate concentration, the boiler water can be conditioned so that adherent scale formation is inhibited. No analysis of the feed water is necessary or desirable, other than to test it for acidity now and then with an appropriate indicator, such as brom phenol blue or methyl orange.

The preferred procedure is for the boiler operator to test the water from time to time in the boiler to determine the sulphate radical and carbonate radical concentrations, and then on the basis of the data furnished by the curves of Figure 5, to introduce sufficient carbonate radical in the form of a soda ash or sodium bicarbonate solution, to maintain the carbonate radical slightly above the theoretical amount called for. The boiler operator does not need to know the absolute amount in pounds of soda ash to be added. He simply keeps introducing from time to time, or continuously, sufficient soda ash to maintain the desired carbonate concentration.

The testing of the boiler water gives an immediate and reliable indication of the ultimate concentration of sulphate radical in the boiler caused by the introduction of fresh feed water, the concentration of the feed water by steam evaporation and the removal of blow-down water, and is, in general, the most satisfactory way to determine the ultimate sulphate radical concentration which must be contended with. The ultimate sulphate radical concentration which must be taken care of may, however, be determined by more indirect methods, for example, the feed water may be tested to determine the amount of sulphate radical contained therein, and then the concentration of the feed water which takes place in the boiler may be determined by a determination of the chlorine concentration in feed and boiler water, or by knowledge of the amount of water evaporated, the moisture in the steam, and blow down. If we know in any particular case the number of concentrations which the feed water undergoes in making the boiler water, and if we know the amount of decomposition of the carbonate radical into hydroxyl radical during this process of concentration, then it becomes possible to introduce into the feed water the amount of carbonate radical which will be the amount demanded by the sulphate radical concentration in accordance with the curves of Figure 5. In this way, the amount of carbonate introduced may be calculated without actually testing the water in the boiler. However, it is much preferred to check the sulphate and carbonate radical concentrations in the boiler water from time to time, and to regulate the amount of carbonate introduced accordingly. For example, in feed water taken from rivers, the amount of sulphate concentration will vary considerably from month to month or even from day to day, and such variations are immediately checked by the sulphate analysis of the boiler water.

The development of OH ion in the boiler water at the expense of $CO_3$ ion has been discussed. In view of the $CO_3$ concentration which must be maintained, the amount of OH ion developed is ample at all times to insure the precipitation of Mg largely as $Mg(OH)_2$, since its solubility product is so small, probably approximately 0.015 at 185° C., and thus largely prevent any silicate scale formation. In fact, care must be taken that the OH concentration does not rise high enough so that $Ca(OH)_2$ is precipitated in place of calcium carbonate. If the sulphate radical concentration in the boiler water is 3,000 parts per million, reference to Figure 5 discloses that at 150 pounds per square inch gage pressure, slightly more than 270 parts per million of carbonate radical will be necessary in the boiler water to insure the precipitation of calcium as non-adherent calcium carbonate. In case the sulphate concentration is only 2,000 parts per million, then the concentration of carbonate radical need be but 180 parts per million. But while $K_{s.p.}Ca(OH)_2 = 23$, approximately, a concentration of 1050 parts per million of OH in the first example, in which the concentration of $CO_3$ was slightly greater than 270 parts per million, and of 850 parts per million in the second example, in which the carbonate concentration was slightly greater than 180 parts per million, would be sufficient to result in the deposition of $Ca(OH)_2$, if the concentration of the $CO_3$ were permitted to fall below its limiting value.

The hydroxyl concentration in the water in the boiler may be checked from time to time by ordinary titration methods. Usually with boilers operating at or below 150 pounds per square inch gage pressure, the hydroxyl concentration will not rise sufficiently to cause any danger of precipitating the calcium hydroxide as adherent scale. Between the pressure of 150 and 200 pounds per square inch, the hydroxyl concentration should be observed and may be regulated if it rises to too high a concentration by using sodium bicarbonate as a source of carbonate ion. Above the gage pressure of 200 pounds per square inch, it will be advisable in most cases to use, not carbonate radical, but phosphate radical, because the development of hydroxyl radical does not proceed as far as with carbonate radical, since the phosphate radical is more stable at higher temperatures. At the higher temperatures, owing to the exceedingly slight partial pressure of carbon dioxide in the vapor phase in the boiler and to the augmented rate of decomposition with temperature increase, the decomposition of sodium carbonate is so rapid that it would be impossible to maintain the requisite carbonate concentration to cause the precipitation of the calcium as calcium carbonate, irrespective of the excessive hydroxyl concentration caused by such decomposition. A second reason why the phosphate radical is preferable at the higher pressures is due to the fact that as the gage pressure of the boiler increases, the amount of favorable radical, such as carbonate or phosphate, which is necessary to prevent precipitation of calcium sulphate, also increases because of the continued decrease in the solubility of calcium sulphate with increasing pressure, and the consequent necessity of maintaining a greater excess of favorable ion, in order to maintain the intersection of the sulphate and the favorable ion curve in a position to the right of the pressure at which the boiler is operated, as indicated on Figure 4. The curve of Figure 5 can be used when sodium bicarbonate is used, as well as when sodium carbonate is used, since both of these introduce the carbonate radical for which Figure 5 is plotted. When phosphate ion is introduced, as by the introduction of trisodium phosphate, a similar set of curves developed according to the principles already indicated for the curves of Figure 5 may be made up and used in like manner. In my copending application, Serial No. 351, filed January 3, 1925, I have presented claims directed more particularly to the use of phosphate or similar stable radical.

The conditioning of the boiler water may be carried out in various ways and may be combined with pretreatment and filtration or both. The simplest procedure and one which may be carried out with relatively pure waters is the introduction of the soda ash or other treating chemical directly into the boiler, as required, and the removal of the sludge and the limitation of the concentration of soluble salts by blow-down. If desired, the feed water before introduction into the boiler may be given a primary treatment to remove the calcium and other salts to the limit of their solubilities in the feed water, and the soda ash or other chemical for secondary treatment (that is, the treatment for prevention of calcium sulphate scale formation), may be introduced into the boiler, or the feed water may have added to it, before introduction into the boiler, a sufficient amount of soda ash for both full primary and secondary treatment. In the broader aspect of the invention, it is immaterial where the soda ash or other chemical is introduced into the water, so long as the conditions for the prevention of encrusting scale precipitation are continuously maintained.

The conditioning treatment may be advantageously combined with sludge separation from a portion of the boiler water taken from the boiler and returned to it after removal of the sludge therefrom. The combination of these treatments gives any desired control of the concentration of suspended solids in the boiler water.

In Figure 6 of the drawings is illustrated a sludge-separating apparatus attached to a boiler for withdrawing a part of the boiler water contaminated with sludge, separating the sludge therefrom and returning the heated water, freed from its sludge content, to the boiler.

In the drawings, reference numeral 1 indicates a boiler shown diagrammatically. A sludge separator 2 is connected with the boiler by pipes 3 and 4, through which the water is continuously withdrawn and returned to the boiler by means of a pump 5. The water is withdrawn through the pipe 3 from a place which is preferably near the water line of the boiler where the concentration of the suspended solids is greatest, and the water freed from the sludge is preferably returned to the boiler at a point where it passes directly to the more highly heated surfaces of the boiler. The sludge separator 2 may be any sort of a device which will separate the sludge from the water passing through it. The preferred device is a filter having a filter bed of some granular material which is unaffected by the hot alkaline boiler water, such, for example, as iron oxide, or a silicate in which the acidic character of the silica is already fully neutralized by a metal component, such, for example, as the olivine minerals, as described in my copending application, Serial No. 710,740, filed May 3, 1924, for filtration of alkaline waters. A centrifugal separator may be used, if desired to separate the sludge.

The increment of suspended solids in the boiler water is a function of such potential solids in the feed water, and the amount of feed water which enters, together with the amount of blow-down and moisture loss in the steam. By removing varying amounts of boiler water continuously and passing them through the sludge-removing device, any condition desired can be maintained in the boiler water as regards the amount of suspended solids. Thus, in a boiler with 1% blow-down, in which the potential suspended solids in the feed water are 170 parts per million and the inflow of feed water is 150,000 pounds per hour, if nothing but blow-down is used, the suspended solids will eventually reach approximately 17,000 parts per million. If, however, a quantity of water equal to 5% of the feed water is passed through the sludge-removing device and all sludge removed, the concentration of insoluble solids in the boiler water will be about 2,800 parts per million. If 10% is passed through the sludge-removing device, the insoluble solids in the boiler water will be reduced to approximately 1,600 parts per million, and so on. These figures are based upon an assumption of complete suspension of the insoluble solids in the boiler water and complete removal thereof by the sludge-separating device. These assumptions will be rather closely approximated under actual conditions.

The separation of the sludge from water drawn and returned to the boiler may be effected without much loss of heat from the boiler water and will greatly reduce the amount of water required for blow-down.

The treating chemical, such as the sodium carbonate, may be introduced at any desired point. In the drawings, a tank 6 is shown for holding a solution of the treating chemical. The solution may be continuously or intermittently pumped from this tank by a pump 7 and introduced through a pipe 8 into the water, just prior to its entry into the sludge-separating device 2, or the solution may be pumped through a pipe 9 and introduced into the boiler with the feed water from the feed water pipe 10, or may be introduced at any desired place in the boiler through an entirely separate pipe, such as shown for example, at 11.

The present invention may be applied to the treatment of water in boilers other than to the pressure boilers used for power or heating purposes. For example, it may be employed in the devices commonly called evaporators, but which are, in fact, really boilers in that they cause an evaporation of the water which is afterwards condensed as a distilled water for use in power-generating boilers supplying condensing engines provided with efficient condenser systems. These evaporators may be operated under a partial vacuum so that the temperature of the water being evaporated may be considerably below the normal boiling point of water at atmospheric pressures. Under these conditions of lower temperature evaporation, the sodium carbonate, or other treating chemical, is not as rapidly hydrolyzed to introduce hydroxyl ion into the water at higher temperatures, so that it may be advisable to introduce hydroxyl directly as by the addition of sodium hydroxide. By such treatment, the formation of troublesome scale in the evaporator may be prevented. The term "steam boiler", as used in the specification and claims, is intended as a term of general definition and not of limitation, and to include all devices in which water is evaporated, whether below or at above atmospheric pressures, and in which concentration of impurities results from the removal of pure water by evaporation.

While the theoretical considerations underlying the present invention have been stated in considerable detail, as well as specific examples of its application, it is to be understood that the invention is not limited to such details or to the preferred manner of procedure above outlined, but that the invention may be embodied in other methods of procedure within the scope of the following claims.

I claim:

1. The process of preventing the formation of adherent scale by steam boiler water containing a scale forming metal of the second group of the periodic system and a negative ion favorable to the formation of adherent scale, which comprises maintaining in the water in the boiler a concentration of a negative ion favorable to the formation of non-adherent sludge not less than the concentration of the negative ion favorable to the formation of scale times the ratio of the solubility product of the second group metal compound of the ion favorable to the formation of a sludge to the solubility product of the second group metal compound of the ion favorable to the formation of scale, all to their appropriate exponents, at the temperature of the water in the boiler.

2. The process of preventing the formation of adherent scale by steam boiler water containing calcium and sulphate, which comprises maintaining in the water in the boiler a concentration of a negative ion favorable to the formation of non-adherent sludge not less than the concentration of the sulphate ion times the ratio of the solubility product of the calcium compound of the ion favorable to the formation of sludge to the solubility product of calcium sulphate, all to their appropriate exponents, at the temperature of the water in the boiler.

3. The process of preventing the formation of adherent scale by steam boiler water containing calcium and sulphate, which comprises maintaining in the water in the boiler a concentration of carbonate ion not less than the concentration of sulphate ion times the ratio of the solubility product of calcium carbonate, to the solubility product of calcium sulphate, at the temperature of the water in the boiler.

4. The process of the preventing the formation of adherent scale by steam boiler water containing calcium and sulphate, which comprises maintaining in the water in the boiler such concentrations of carbonate ion and hydroxyl ion that the concentration of carbonate ion is not less than the concentration of sulphate ion times the ratio of the solubility product of calcium carbonate to the solubility product of calcium sulphate and not less than the square of the concentration of hydroxyl ion times the ratio of the solubility product of calcium carbonate to the solubility product of calcium hydroxide, at the temperature of the water in the boiler.

5. The process of preventing the formation of adherent scale by steam boiler water containing calcium and sulphate, which comprises maintaining in the water in the boiler such concentrations of hydroxyl ion and a negative ion favorable to the formation of non-adherent sludge that the concentration of the negative ion favorable to the formation of non-adherent sludge is not less than the concentration of sulphate ion times the ratio of the solubility product of the calcium salt of the ion favorable to the formation of sludge to the solubility product of calcium sulphate, all to their appropriate exponents, and not less than the concentration of hydroxyl ion times the ratio of the solubility product of the calcium salt of the negative ion favorable to the formation of a sludge to the solubility product of calcium hydroxide, all to their appropriate exponents, at the temperature of the water in the boiler.

6. The process of preventing the formation of adherent scale by steam boiler water containing calcium and sulphate, which comprises introducing sodium carbonate into the water in regulated amounts so as to maintain in the water in the boiler the concentration of carbonate ion not less than the concentration of sulphate ion times the ratio of the solubility product of calcium carbonate to the solubility product of calcium sulphate and not less than the square of the concentration of hydroxyl ion times the ratio of the solubility product of calcium carbonate to the solubility product of calcium hydroxide, at the temperature of the water in the boiler.

7. The process of preventing the formation of adherent scale by steam boiler water containing calcium and sulphate, which comprises continuously maintaining in the water in the boiler such relative concentrations of calcium ion, sulphate ion and a negative ion favorable to the formation of a non-adherent sludge-forming calcium salt that the calcium is precipitated as a non-adherent sludge instead of calcium sulphate scale.

8. The process of preventing the formation of adherent scale by steam boiler water containing calcium and sulphate, which comprises continuously maintaining in the water in the boiler such relative concentrations of calcium ion, sulphate ion, hydroxyl ion and a negative ion favorable to the formation of a non-adherent sludge-forming calcium salt that the calcium is precipitated as a non-adherent sludge instead of a calcium sulphate or a calcium hydroxide scale.

9. The process of preventing the formation of adherent scale by steam boiler water containing calcium and sulphate, which comprises introducing into the water material yielding in solution a negative ion favorable to the formation of non-adherent sludge-forming calcium salt in such amount as to maintain in the water in the boiler such relative concentrations of calcium ion, sulphate ion and the negative ion favorable to the sludge formation that the solubility product of the calcium salt of the negative ion favorable to sludge formation will be exceeded before the solubility product of calcium sulphate is reached at the temperature of the water in the boiler.

10. The process of preventing the formation of adherent scale by steam boiler water containing calcium and sulphate, which comprises introducing into the water a salt yielding in solution hydroxyl ion and a negative ion favorable to the formation of a non-adherent sludge-forming calcium salt and maintaining in the water in the boiler such relative concentrations of calcium ion, sulphate ion, hydroxyl ion and the negative ion favorable to sludge formation that the solubility product of the calcium salt of the negative ion favorable to sludge formation will be exceeded before the solubility products of calcium sulphate and calcium hydroxide are reached at the temperature of the water in the boiler.

11. The process of preventing the formation of adherent scale by steam boiler water containing calcium and sulphate, which comprises introducing into the water an alkali carbonate and carbonic acid in such relative amounts as to cause the precipitation in the water in the boiler of calcium carbonate as a non-adherent sludge instead of adherent scale-forming calcium sulphate or calcium hydroxide.

12. The process of preventing the formation of adherent scale by steam boiler water containing calcium and sulphate, which comprises determining the sulphate concentration of the water and on the basis of such determination introducing into the water material yielding in solution a negative ion favorable to the formation of a non-adherent sludge-forming calcium salt in such amounts as to cause precipitation of the calcium in the water in the boiler as a non-adherent sludge instead of calcium sulphate scale.

13. The process of preventing the formation of adherent scale by steam boiler water containing calcium and sulphate, which comprises determining the sulphate concentration of the water and on the basis of such determination introducing into the water material yielding in solution a negative ion favorable to the formation of a non-adherent sludge-forming calcium salt in such amounts as to continuously maintain in the water in the boiler such relative concentrations of calcium ion, sulphate ion and the negative ion favorable to sludge formation that the solubility product of the calcium salt of the negative ion favorable to sludge formation will be exceeded before the solubility product of calcium sulphate is reached at the temperature of the water in the boiler.

14. The process of preventing the formation of adherent scale by steam boiler water containing calcium and sulphate, which comprises introducing into the water material yielding in solution a negative ion favorable to the formation of a non-adherent sludge-forming calcium salt, from time to time determining the concentrations in the boiler water of sulphate and the negative radical yielding such negative ion, and on the basis of such determinations adding as required more material yielding the negative ion favorable to sludge formation in amounts sufficient to continuously maintain such relative concentrations of said negative ion, calcium ion and sulphate ion that the solubility product of the calcium salt of the ion favorable to sludge formation will be exceeded before the solubility product of calcium sulphate is reached at the temperature of the water in the boiler.

15. The process of preventing the formation of adherent scale by steam boiler water containing calcium and sulphate, which comprises introducing into the water material yielding in solution hydroxyl ion and a negative ion favorable to the formation of a non-adherent sludge-forming calcium salt, from time to time determining the concentrations in the boiler water of sulphate, hydroxyl and the radical yielding the ion favorable to sludge formation, and on the basis of such determinations introducing as required more material yielding hydroxyl ion and the negative ion favorable to sludge formation in such amounts that the solubility product of the calcium salt of the ion favorable to sludge formation will be exceeded before the solubility products of calcium sulphate and calcium hydroxide are reached at the temperature of the water in the boiler.

16. The process of preventing the formation of adherent scale by steam boiler water containing calcium and sulphate, which comprises introducing into the water material yielding in solution an ion favorable to the formation of a non-adherent sludge-forming calcium salt in sufficient amounts to cause the precipitation of such calcium salt as sludge in the boiler, continually removing a portion of the water from the boiler, separating the sludge therefrom, and returning the water to the boiler.

17. The process of preventing the formation of adherent scale by steam boiler water containing calcium and sulphate, which comprises introducing into the water sodium carbonate in sufficient amounts to cause the precipitation of calcium carbonate as sludge in the boiler, continually removing a portion of the water from the boiler, separating the sludge therefrom, and returning the water to the boiler.

18. The process of preventing the formation of adherent scale by steam boiler water containing a scale-forming metal of the second group of the periodic system and a negative ion favorable to the formation of adherent scale, which comprises maintaining in the water in the boiler such relative concentrations of the second group metal, the negative ion favorable to the formation of adherent scale and a negative ion favorable to the formation of a non-adherent sludge-forming salt that the second group metal is precipitated as a non-adherent sludge instead of adherent scale.

19. The process of preventing the formation of adherent scale by steam boiler water containing calcium and sulphate, which comprises determining the sulphate concentration of the water and on the basis of such determination introducing into the water carbonate in such amount as to cause the precipitation in the water in the boiler of the calcium as a non-adherent calcium carbonate sludge instead of calcium sulphate scale.

20. The process of preventing the formation of adherent scale by steam boiler water containing calcium and sulphate, which comprises introducing carbonate into the water, from time to time determining the concentration of carbonate and sulphate in the water, and on the basis of such determination adding as required more carbonate in amount sufficient to maintain in the water in the boiler such relative concentrations of calcium carbonate and sulphate that the solubility product of calcium carbonate will be exceeded before the solubility product of calcium sulphate is reached at the temperature of the water in the boiler.

21. The process of preventing the formation of adherent scale by steam boiler water containing calcium, magnesium, sulphate and silicate, which comprises maintaining in the water in the boiler a concentration of hydroxyl ion and a negative ion favorable to the formation of a non-adherent calcium salt, such that the magnesium and calcium are precipitated as sludges instead of an adherent scale.

22. The process of preventing the formation of adherent scale in steam boilers using feed water containing calcium and sulphate, which comprises decreasing the sulphate by means of a barium compound and maintaining in the water in the boiler a concentration of a negative ion favorable to the formation of non-adherent sludge not less than the concentration of the sulphate ion times the ratio of the solubility product of the calcium compound of the ion favorable to the formation of sludge to the solubility product of calcium sulphate, all to their appropriate exponents, at the temperature of the water in the boiler.

23. The process of preventing the formation of adherent scale in steam boilers using feed water containing calcium and sulphate which comprises decreasing the sulphate by means of a barium compound and maintaining in the water in the boiler a concentration of carbonate ion not less than the concentration of sulphate ion times the ratio of the solubility product of calcium carbonate to the solubility product of calcium sulphate, at the temperature of the water in the boiler.

In testimony whereof I have hereunto set my hand.

RALPH E. HALL.